INVENTOR
R. D. KUERSTON
BY Young and Quigg
ATTORNEYS

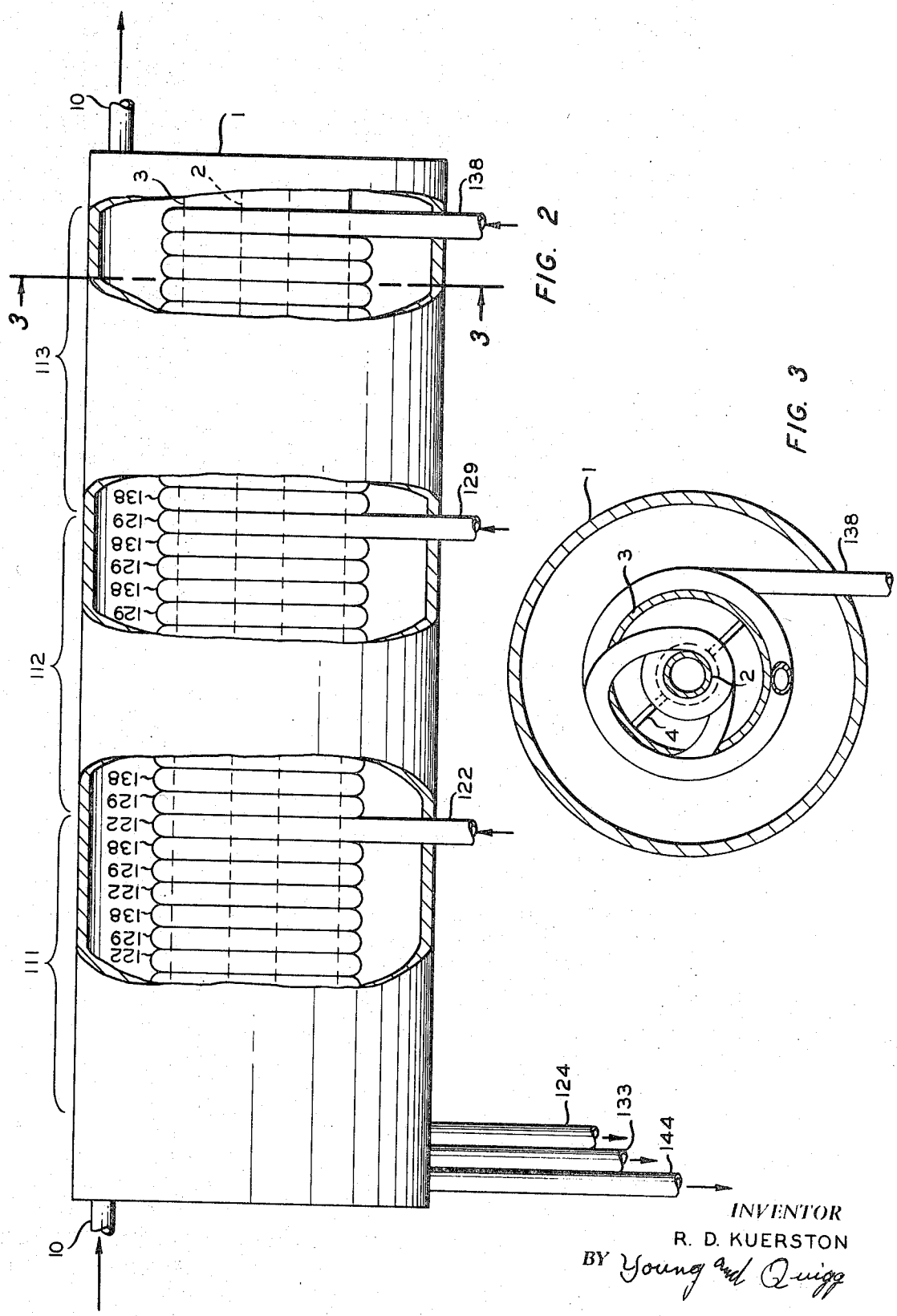

United States Patent Office 3,548,606
Patented Dec. 22, 1970

3,548,606
SERIAL INCREMENTAL REFRIGERANT EXPANSION FOR GAS LIQUEFACTION
Richard D. Kuerston, Bartlesville, Okla., assignor to Phillips Petroleum Company, a corporation of Delaware
Continuation of application Ser. No. 510,244, Nov. 29, 1965. This application July 8, 1968, Ser. No. 748,894
Int. Cl. F25j *1/00, 1/02, 5/00*
U.S. Cl. 62—9                                                8 Claims

ABSTRACT OF THE DISCLOSURE

A gaseous feed stream is cooled by cascaded propane, ethylene and methane refrigerants. Each refrigerant is expanded serially to obtain different pressure level refrigerant portions. The respective different pressure level propane refrigerant portions are then passed into separate heat exchange zones to cool the gaseous feed, the lowest pressure refrigerant traversing the entire exchange zone, while the intermediate and high pressure refrigerants are introduced at spaced points intermediate the exchange zone. Ethylene and methane refrigerants are similarly serially expanded and passed through a heat exchange zone.

---

Figure 1:
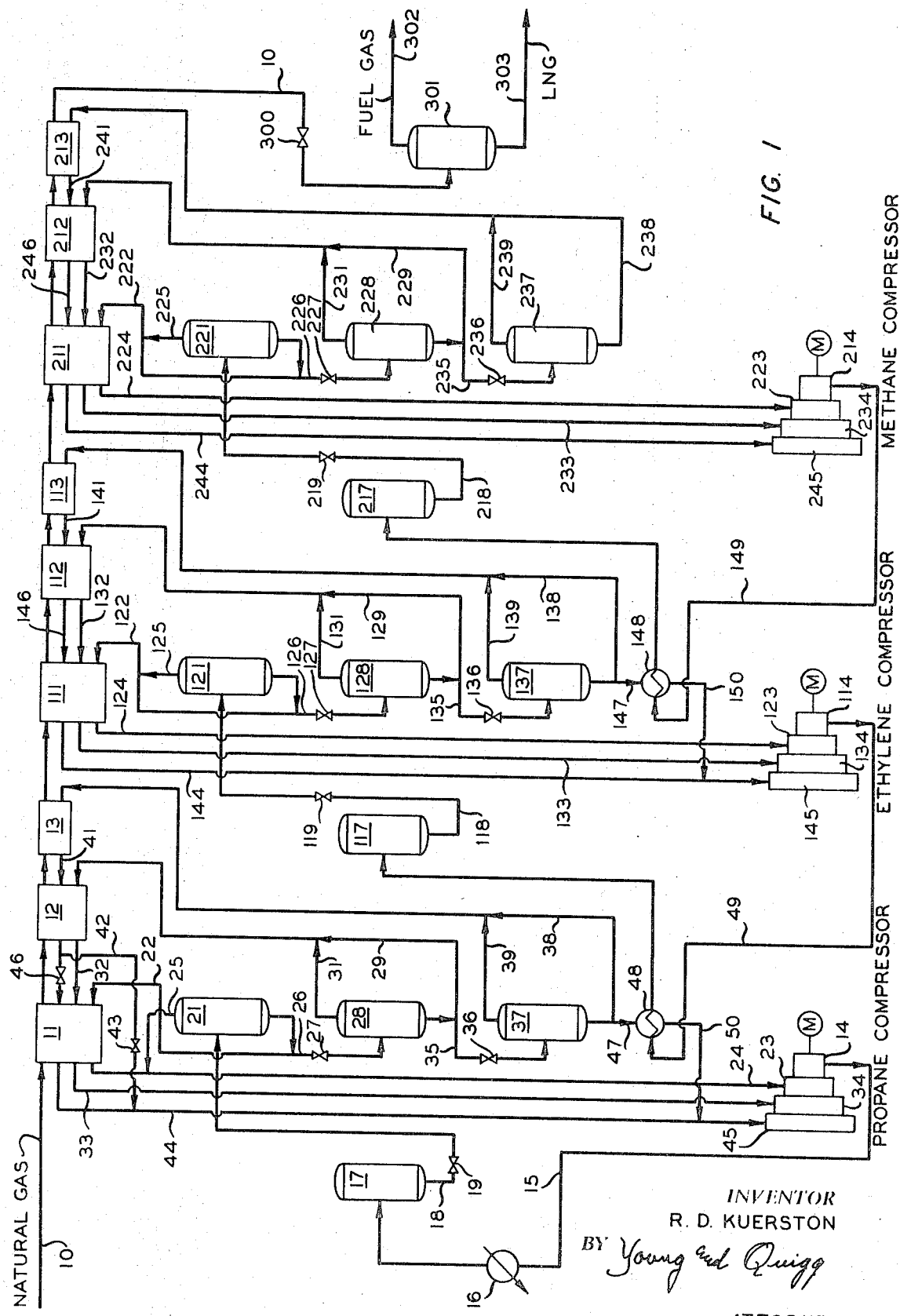

This is a continuation of application Ser. No. 510,244, filed Nov. 29, 1965 and now abandoned.

This invention relates to the liquefaction of a gas. In another aspect it relates to a refrigeration cycle for natural gas liquefaction. In another aspect this invention relates to a method and means for expansion of a refrigerant in a refrigeration system. In still another aspect this invention relates to a method and means for attaining optimum efficiency of the refrigerant in a refrigeration system.

In the liquefaction of a gas such as natural gas, methane, nitrogen, oxygen, and the like, by low temperature refrigeration to produce liquefied gas for storage or transport or for the recovery of gaseous helium therefrom, it is of utmost importance to obtain maximum efficiency of the refrigeration cycle in order to keep power and equipment costs at a minimum.

According to the present invention the refrigerant in a refrigeration system is expanded to at least two pressure levels and passed in parallel, indirect heat exchange relationship with the process gas stream being liquefied. Parallel heat exchange relationship means that the refrigerant expanded to the highest pressure is passed in countercurrent flow heat exchange relationship with the warm process gas stream; and the refrigerant expanded to the lowest pressure level is heat exchanged with the process gas effluent from the first heat exchange step in a second heat exchange step and is then passed in heat exchange relationship with the process gas in the first heat exchange step. Thus the refrigerant vapors exit the heat exchangers at substantially the same temperature but at different pressure levels so that the sensible heat of the refrigerant vapors, as well as the latent heat of vaporization of the refrigerant is utilized in cooling the process gas stream.

It is an object of this invention to provide a method and means for conserving energy in the liquefaction of a gas such as methane or natural gas. It is also an object of this invention to provide a method and means for parallel flow of refrigerant with the gas to be cooled where the refrigerant is utilized at a plurality of temperature and/or pressure levels. Still another object of the invention is to provide a method and means for optimum utilization of each refrigerant in a cascade refrigeration cycle. Other objects, aspects, and advantages of the invention will be apparent to one skilled in the art upon studying the disclosure including the detailed description of the invention and the appended drawing wherein:

FIG. 1 is a schematic flow diagram of a preferred embodiment of the invention;
FIG. 2 is a schematic illustration of one modification of a heat exchanger according to the invention; and
FIG. 3 is a section taken along lines 3—3 of FIG. 2.

In the embodiment shown in FIG. 1 of the drawing, natural gas from which gasoline components have been removed is passed through conduit 10 at about 600 pounds per square inch absolute (p.s.i.a.) to a first heat exchanger 11, a second heat exchanger 12 and a third heat exchanger 13. Propane is compressed to about 220 p.s.i.a. in compressor 14 and passed via conduit 15 to a water cooler 16 where the propane is condensed with 90° F. water and passed to a surge tank 17. Liquid propane is removed from surge tank 17 and passed via conduit 18 through valve 19 and flashed from valve 19 into flash chamber 21 maintained at about 40° F. and about 80 p.s.i.a. Liquid propane at about 40° F. is taken from flash tank 21 and passed via conduit 22 through heat exchanger 11 and the vapors from heat exchanger 11 are passed to the high compression stage 23 of propane compressor 14 via conduit 24. Vapors from flash tank 21 are removed via conduit 25 and also passed to high stage compression via conduit 24. Liquid from flash tank 21 is also passed via conduit 26 and flash valve 27 to flash tank 28 where the temperature is maintained at about 10° F. at a pressure of about 45 p.s.i.a. Liquid is removed from flash tank 28 via conduit 29 and is joined with vapor from flash tank 28 via conduit 31 and passed to heat exchanger 12 and then via conduit 32 to heat exchanger 11 and then via conduit 33 to the intermediate stage of compression 34 of propane compressor 14. Liquid from flash tank 28 is also passed via conduit 35 and flash valve 36 to flash tank 37 where the temperature is maintained at about −30° F. at a pressure of about 20 p.s.i.a. Liquid from flash tank 37, passed via conduit 38, is joined by vapors passed via conduit 39 and then passed to heat exchanger 13 and then to heat exchanger 12 via conduit 41 and thence via conduit 42 and valve 43 to conduit 44 and thence to the low compression stage 45 of propane compressor 14. Alternatively valve 43 can be closed and valve 46 opened so that the propane flows also through heat exchanger 11 and thence to conduit 44. A portion of the liquid from flash tank 37 is passed via conduit 47 through heat exchanger 48 in indirect heat exchange with ethylene in conduit 49 and thence via conduit 50 to conduit 44.

Ethylene is compressed to about 300 p.s.i.a. in ethylene compressor 114 and passed via conduit 49 through heat exchanger 48 where it is condensed by heat exchange with liquid propane and passed to surge tank 117 at about −20° F. and about 300 p.s.i.a. Liquid ethylene is removed from surge tank 117 via conduit 118 and flashed through valve 119 into flash tank 121 at about −90° F. and about 80 p.s.i.a. Liquid from flash tank 121 is passed via conduit 122, together with vapor in conduit 125, through heat exchanger 111 and thence through conduit 124 to high stage of compression 123 of ethylene compressor 114. Liquid from flash tank 121 is also passed via conduit 126 and flash valve 127 to flash tank 128 at about −135° F. and about 30 p.s.i.a. Liquid ethylene is removed from flash tank 128 and passed via conduit 129, along with vapors from conduit 131, to heat exchanger 112 and thence through heat exchanger 111 to conduit 132 and then into the intermediate stage of compression 133 of ethylene compressor 114. Liquid ethylene from flash tank 128 is also passed via conduit 135 through flash valve 136 and thence into flash tank 137 at about −140° F.

and about 25 p.s.i.a. Liquid is passed from flash tank 137 via conduit 138 together with vapors in conduit 139 through heat exchanger 113, conduit 141, heat exchanger 112, conduit 146, heat exchanger 111 and conduit 144 to the low stage of compression 145 of ethylene compressor 114. Liquid ethylene from flash tank 137 is also passed via conduit 147 through heat exchanger 148 in indirect heat exchange with methane in conduit 149. Ethylene is passed from heat exchanger 148 via conduit 150 to conduit 144.

Methane is compressed in compressor 214 to about 540 p.s.i.a., passed via conduit 149 and methane condenser 148 and then to surge tank 217 at about −130° F. and about 530 p.s.i.a. Liquid methane from surge tank 217 is passed via conduit 218 and flashed via valve 219 into flash tank 221 at about −175° F. and about 215 p.s.i.a. Liquid from flash tank 221 is passed via conduit 222, together with vapor in conduit 225, to heat exchanger 211 and thence via conduit 224 to the high stage of compression 223 of methane compressor 214. Liquid from flash tank 221 is also passed via conduit 226, flashed in valve 227 into flash tank 228 at about −210° F. and about 85 p.s.i.a. Liquid in flash tank 228 is passed via conduit 229 along with vapor in conduit 231 to heat exchanger 212 and then through conduit 232, heat exchanger 211 and conduit 233 to the intermediate stage of compression 234 of methane compressor 214. Liquid from flash tank 228 is also passed via conduit 235, flashed in valve 236 into flash tank 237 at about −240° F. and a pressure of about 30 p.s.i.a. Liquid from flash tank 237 is passed via conduit 238 along with vapor from conduit 239 to heat exchanger 213 and thence via conduit 241, heat exchanger 212, conduit 246, heat exchanger 211 and conduit 244 to the low stage of compression 245 of methane compressor 214.

Natural gas in conduit 10 is then flashed through valve 300 into product tank 301 at about −258° F. and about 15 p.s.i.a. (about atmospheric pressure). Vapors removed from product tank 301 via conduit 302 are passed to fuel gas supply and liquid natural gas product is removed as needed via conduit 303.

The heat exchangers 11, 12 and 13; 111, 112 and 113; and 211, 212 and 213 can be fabricated as shown in FIGS. 2 and 3; for example, the heat exchangers represented at 111, 112 and 113 can be enclosed in a shell 1 having a primary core 2 and a secondary core 3 with tubing wrapped about the cores in alternate steps as shown in FIG. 3 with conduit 138 passing first about the secondary core 3 and then about the primary core 2, again about the secondary core 3, again about the primary core 2, and repeated in this sequence through section 113 to section 112 where conduit 129 enters the heat exchanger and then conduits 138 and 129 will alternate and the sequence will be repeated through heat exchanger section 112 until conduit 122 enters the heat exchanger in section 111 and these conduits will then alternate among conduits 138, 129 and 122 to the end of the heat exchanger.

The primary core 2 can be tubular and the secondary core 3 can be made up of wheel-like segments supported on primary core 2 by spokes 4 with openings for entrance to and exits from the secondary core 3.

Any natural gas feed stream will contain compounds heavier than methane and as a result will condense at some temperature warmer than −124° F. at 600 p.s.i.a. (pure methane). This will move the refrigeration load to a warmer temperature and thus reduce the compression requirements for the refrigerants operating at the colder temperatures. The natural gas feed stream will often be obtained as the effluent from a natural gasoline plant and will have the heavier hydrocarbons, water and $CO_2$ removed. In the example used in the description of FIG. 1, the natural gas stream had been dehydrated to a −100° F. dew point and contained less than 0.02 mol percent $CO_2$. If a wet gas stream is to be refrigerated for liquefaction of natural gas, provision should be made to withdraw compounds such as benzene and $CO_2$ which would solidify at the low temperatures contemplated. Such liquids can be tapped off from the heat exchangers at appropriate points of temperature and pressure.

Propane, ethylene and methane have been chosen as the refrigerants in the cascade system in the specific embodiment of the invention described; however, other refrigerants such as ammonia, Freons and the like can be utilized if desired. Hydrocarbons will often be preferred as refrigerants because of their availability in connection with natural gas liquefaction and because of the range of hydrocarbons available for use as refrigerants.

Where liquid and vapor are both introduced into a heat exchanger it may be desirable to utilize a liquid-vapor distributor such as described in U.S. Pat. 3,158,010, issued Nov. 24, 1964.

In order to avoid undue complication of the drawing, numerous conventional elements have been omitted. For example, the compressed ethylene and methane will be water cooled prior to heat exchange with the refrigerant. The refrigeration available in the fuel gas in conduit 302 and the refrigeration available in any refrigerant exiting the main heat exchangers will be utilized.

Reasonable variations and modifications are possible within the scope of this disclosure without departing from the spirit and scope of the invention.

I claim:

1. The process of cooling a stream of gas with a refrigerant wherein said refrigerant is compressed in a plurality of compression stages comprising a high pressure compression stage and a low pressure compression stage and then condensed, comprising the steps of:

flashing the condensed refrigerant serially in increments such that a first increment is flashed to a first high pressure and a second increment is flashed to a lower pressure;

passing the first increment through a first heat exchange zone; passing the second increment through a second heat exchange zone and then through said first heat exchange zone;

passing said stream of gas in indirect heat exchange with said first increment and said second increment in said first heat exchange zone simultaneously and coextensively and subsequently passing said stream of gas in heat exchange with said second increment in said second heat exchange zone;

returning vaporized second increment from said first heat exchange zone to said low pressure compression stage and then to said high pressure compression stage; and returning vaporized first increment from said first heat exchange zone to said high pressure compression stage.

2. The process of claim 1 wherein:

said plurality of compression stages also comprises a lower pressure compression sage lower than said low pressure compression stage;

a third increment is flashed to a lower pressure lower than said low pressure and passed through a third heat exchange zone and then through said second heat exchange zone and then through said first heat exchange zone;

said stream of gas is passed in indirect heat exchange with said first increment, said second increment and said third increment in said first heat exchange zone, subsequently with said second increment and said third increment in said second heat exchange zone and subsequently with said third increment in said third heat exchange zone; and vaporized third increment is returned from said first heat exchange zone to said lower pressure compression stage.

3. The process of claim 2 wherein, in the first heat exchange zone, all of the expanded increments of refrigerant at the warm end of the first heat exchange zone are at about the same temperature.

4. The process of claim 1 wherein:
a second refrigerant is compress in a plurality of compression stages comprising a high pressure second refrigerant compression stage and a low pressure second refrigerant compression stage and then condensed;
the second condensed refrigerant is expanded serially in increments such that a first increment of the second refrigerant is flashed to a high pressure of said second condensed refrigerant and a second increment of the second refrigerant to a low pressure of said second condensed refrigerant;
the first increment of said second refrigerant is passed through a third heat exchange zone;
the second increment of said second refrigerant is passed through a fourth heat exchange zone and then through said third heat exchange zone;
said stream of gas is passed in indirect heat exchange with said refrigerants in said first heat exchange zone, subsequently in said second heat exchange zone, subsequently in said third heat exchange zone and subsequently in said fourth heat exchange zone;
vaporized first increment of the second refrigerant is returned from said third heat exchange zone to said low second refrigerant compression stage; and
vaporized first additional increment of the second refrigerant is returned from said third heat exchange zone to said high pressure second refrigerant compression stage.

5. The process of claim 1 wherein:
in the first heat exchange zone, all of the expanded increments of refrigerant at the warm end of the first heat exchange zone are at about the same temperature.

6. In the process of claim 1 wherein said stream of gas is heat exchanged with liquid propane, liquid ethylene and liquid methane refrigerants:
(1) liquid propane is expanded progressively to three lower pressure levels;
(2) the highest pressure level of expanded liquid propane is passed in heat exchange relationship with said stream of gas in a first heat exchange zone, the intermediate pressure level of expanded liquid propane is passed in a second heat exchange zone, in heat exchange with said stream of gas which has been heat exchanged with high pressure propane, and then with said stream of gas in said first heat exchange zone, a first portion of the lowest pressure level of expanded liquid propane is passed in a third heat exchange zone, in heat exchange relationship with said stream of gas which has been heat exchanged with intermediate pressure propane, then with said stream in said second heat exchange zone, and then with said stream of gas in said first heat exchange zone, a second portion of said lowest pressure level of expanded liquid propane is passed in heat exchange relationship with vaporous ethylene refrigerant causing the ethylene refrigerant to liquefy;
(3) said liquid ethylene refrigerant is passed progressively to three lower pressure levels;
(4) the highest pressure level of expanded liquid ethylene is passed in a fourth heat exchange zone in heat exchange relationship with said stream of gas which has been heat exchanged with propane, the intermediate pressure level of expanded liquid ethylene is passed in a fifth heat exchange zone in heat exchange relationship with said stream of gas which has been heat exchanged with high pressure ethylene and then with said stream of gas in said fourth heat exchange zone, a first portion of the lowest pressure level of expanded liquid ethylene is passed in a sixth heat exchange zone in heat exchange relationship with said stream of gas which has been heat exchanged with intermediate pressure ethylene, then with said stream in said fifth heat exchange zone and then with said stream of gas in said fourth heat exchange zone, and a second portion of said lowest pressure level of expanded liquid ethylene is passed in heat exchange with vaporous methane refrigerant causing the methane refrigerant to liquefy;
(5) said liquid methane refrigerant is expanded progressively to three lower pressure levels;
(6) the highest pressure level of liquid methane refrigerant is passed in a seventh heat exchange zone in heat exchange relationship with said stream of gas which has been heat exchanged with ethylene, the intermediate pressure level of methane is passed in an eighth heat exchange zone in heat exchange relationship with said stream of gas which has been heat exchanged with high pressure methane and then with said stream in said seventh heat exchange zone, the lowest pressure level of methane is passed in a ninth heat exchange zone in heat exchange relationship with said stream of gas which has been heat exchanged with intermediate methane, then with said stream in said eighth heat exchange zone, and then with said stream of gas in said seventh heat exchange zone; and
(7) a cooled stream of gas is recovered from said exchange steps.

7. The process of cooling a gas stream with a refrigerant wherein said refrigerant is compressed in a plurality of compression stages and then condensed, comprising the steps of:
flashing the condensed refrigerant serially in increments such that a first increment is flashed to first highest pressure and each additional increment is flashed to a successively lower pressure;
passing the highest pressure increment through a first heat exchange zone;
passing the next successively lower pressure increment through a second heat exchange zone and then through said first heat exchange zone and passing said stream of gas in indirect heat exchange with said highest pressure increment and said next successively lower pressure increment in said first heat exchange zone and subsequently with said next successively lower pressure increment in said second heat exchange zone wherein:
the refrigerant is compressed in a first low stage, a second intermediate stage and a third high stage of compression;
the compressed refrigerant is cooled and condensed;
the condensed refrigerant is flashed in a first flashing step to about the pressure of the inlet to the third stage of compression to produce a liquid phase and a vapor phase of refrigerant;
a portion of the liquid refrigerant phase from the first flashing step is passed to indirect heat exchange with said stream of gas in a first heat exchange step;
the refrigerant vapor phase from said first flashing step is passed to the inlet to the third stage of compression;
a second portion of the liquid refrigerant phase of the first flashing step is flashed in a second flashing step to about the pressure of the inlet to the second stage of compression to produce a liquid phase and a vapor phase of refrigerant;
a first portion of the liquid refrigerant phase of said second flashing step is passed to indirect heat exchange in a second heat exchange step with said stream of gas after said first heat exchange step and then in indirect heat exchange with said stream of gas in said first heat exchange step causing said first portion of said liquid refrigerant phase from said second flashing step to vaporize;
vaporized first portion of refrigerant from said second flashing step passing successively through said second and said first heat exchange steps is passed to the inlet to the second stage of compression;

a second portion of the liquid phase of said second flashing step is flashed in a third flashing step to about the pressure of the inlet to the first stage of compression to produce a liquid phase and a vapor phase of refrigerant;

a first portion of the liquid refrigerant phase of said third flashing step is passed to indirect heat exchange in a third heat exchange step with said stream of gas effluent from said second heat exchange step and then in indirect heat exchange with said stream of gas in said second and first heat exchange steps causing said first portion of said liquid refrigerant phase from said third flashing step to vaporize; and said vaporized first portion of refrigerant from said third flashing step passing successively through said third, second and first heat exchange steps is passed to the inlet to the first stage of compression.

8. The process of claim 7 wherein the stream of gas being cooled is natural gas.

References Cited

UNITED STATES PATENTS

| | | | |
|---|---|---|---|
| 2,960,837 | 11/1960 | Swenson | 62—40 |
| 3,020,723 | 2/1962 | De Lury | 62—40 |
| 3,144,316 | 8/1964 | Koehn | 62—31 |
| 3,315,477 | 4/1967 | Carr | 62—40 |
| 3,342,037 | 9/1967 | Kniel | 62—40 |
| 3,218,816 | 11/1965 | Grenier | 62—26 |

FOREIGN PATENTS

| | | | |
|---|---|---|---|
| 652,208 | 11/1962 | Canada | 62—40 |

OTHER REFERENCES

Kleemenko, A.P.: One Flow Cascade Cycle in Progress in Refrigeration Technology, Pergamon Press, pp. 34–39.

NORMAN YUDKOFF, Primary Examiner

A. F. PURCELL, Assistant Examiner

U.S. Cl. X.R.

62—23, 40, 114, 199